United States Patent Office 3,140,169
Patented July 7, 1964

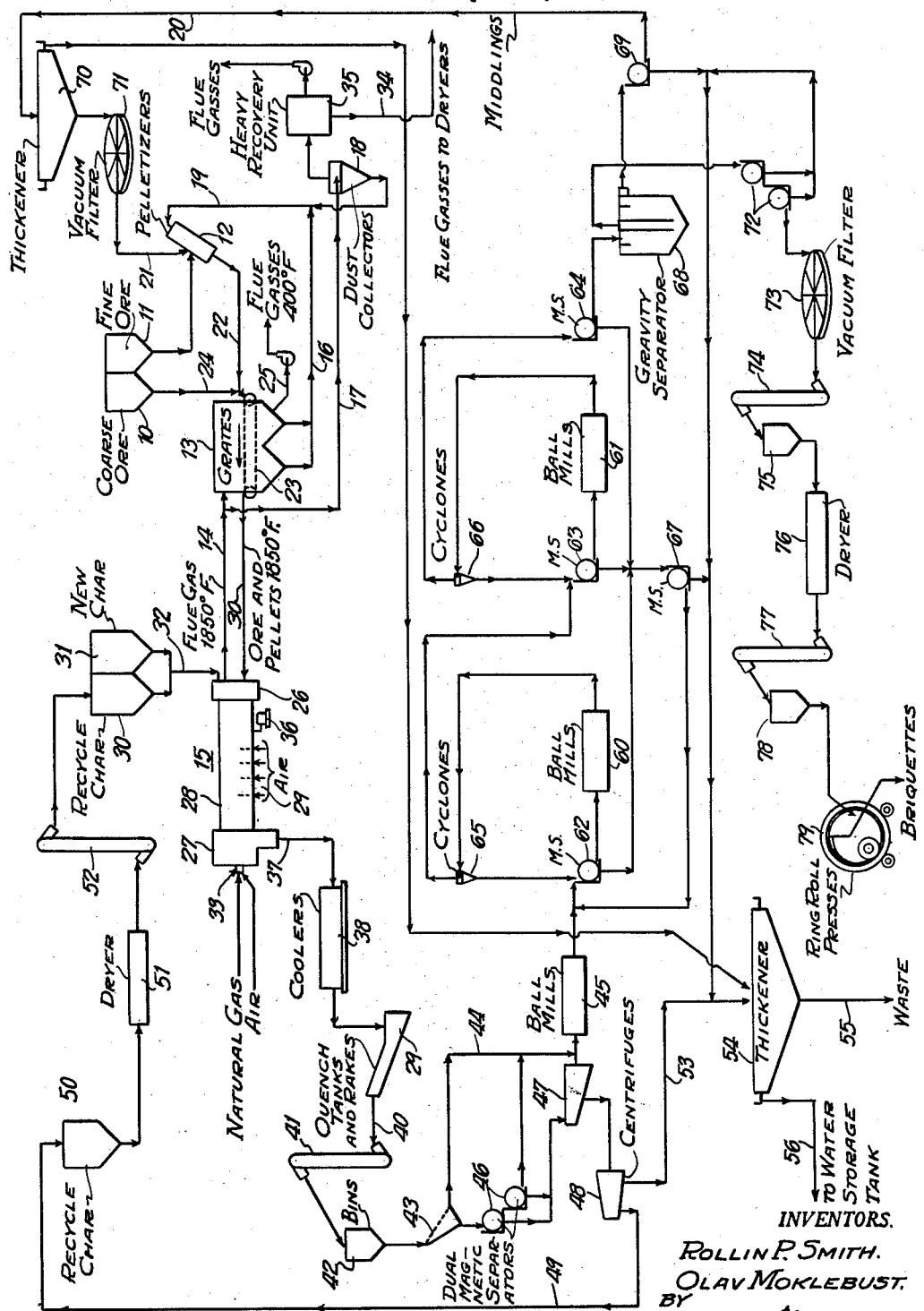

3,140,169
ORE REDUCTION AND RECOVERY METHOD
Rollin P. Smith, New Canaan, and Olav Moklebust, Stamford, Conn., assignors to R-N Corporation, New York, N.Y., a corporation of Delaware
Filed Sept. 27, 1961, Ser. No. 141,203
10 Claims. (Cl. 75—33)

This invention pertains to improvements in ore reduction and recovery methods for the recovery in high yield and as a high purity metallic concentrate, of the metallic iron values of low-temperature-reduced oxidic iron ores and other iron oxide-bearing materials.

Iron ore or other iron oxide bearing materials may be directly reduced, without fusion, at temperatures of about 1800–2000° F. in the presence of a solid carbonaceous reductant, such as coke, char, etc., and in an atmosphere of combustible gases, such as natural gas, carbon monoxide, etc., and a limited supply of oxygen. A preferred such process operating on the rotary kiln principle is described in U.S. Patent 2,829,042 to O. Moklebust.

In accordance with concentional practices as heretofore employed in conjunction with such ore reductions, the metallic iron values are recovered from the so reduced ore by separating and concentrating sequences involving screening, tabling, grinding, magnetic and gravity separations.

We find, however, as applied particularly to certain iron ores as discussed below, that a high purity concentrate, i.e., containing at least 90% total iron and percent metallization together with a high degree of recovery of metallic iron as such from the ore, say on the order of 80–85% or more, cannot be obtained if the iron recovery is carried out in accordance with the basic technique above set forth.

The reasons for this we have observed to be as follows. In some ores, as typified for example by the Alabama Big Seam and Canadian Peace River ores, the iron oxide values are agglomerated with the gangue in masses or particles ranging from relatively large down to extremely fine, the fine particles constituting a substantial fraction of the total iron oxide content of the ore. Reduction of the ore while reducing these iron oxide particles to the metallic state, does not greatly affect their size and distribution throughout the gangue. On subsequent concentration, therefore, as by grinding and magnetic separation, the relatively large masses or particles of metallic iron are easily broken away from the gangue during grinding and thereafter magnetically separated from the gangue and concentrated.

With respect to the fine particles of metallic iron, however, although grinding removes the major portion of the associated gangue, there nevertheless remains a small amount adherently bonded to the iron particles which no amount of grinding will split off. As a result, these fines are diverted to the tailings in order to obtain a high purity final concentrate, with resultant relatively low recovery of metallic iron from the ore.

Nor can this recovery be feasibly increased by subjecting the tailings to separation of a middlings fraction of relatively high iron content and admixing with the high purity final iron concentrate, because this reduces the purity of the resulting concentrate below a commercially acceptable level.

Now we have discovered, and it is on this that our invention is predicated, that if the reduced ore product is subjected to concentration of the iron values by the conventional technique above stated, including successive stages of grinding and concentration, to the extent that only the gangue material which is quite low in iron values, say on the order of 30% or under, has been diverted to tailings, and if the concentrate obtained at this stage is separated, as by a gravity separation, into concentrate fractions of higher and lower purity or percent metallization and iron content, and the low purity fraction, or preferably a middlings fraction thereof, is pelletized and recycled through the kiln, along with fresh ore and solid reductant, that a high purity final concentrate is thereby obtained in which the percentage of recovery of metallic iron from the ore is much higher than otherwise.

Our experiments have demonstrated, for example, as detailed below, that in order to obtain by conventional concentrating techniques from low-temperature-reduced iron ores of the character aforesaid, a high purity final concentrate containing at least 90% total iron and percent metallization, the iron values which must be diverted to tailings is such that the recovery of metallic iron as such from the ore is only about 60–65% or less. We find, on the other hand, that by employment of my invention as above outlined, recovery of metallic iron as such from the ore is increased to the order of about 85–90% or more, consistent with a degree of purity of the final iron concentrate equal to or better than that above stated.

Without being bound to any particular theory as to the basis for this observed improvement, it appears to be brought about as follows. On the first pass of the fresh ore through the kiln, the iron oxide values are reduced to the metallic state without substantially altering the particle size or distribution thereof throughout the gangue matrix, as above explained. On subsequent concentration, also as above explained, the gangue is stripped from the coarse particles of metallic iron and most of the gangue is stripped from the fine particles thereof. Hence when a middlings fraction of the lower purity fraction of the concentrate obtained as aforesaid, is separated out and pelletized, the iron particles are disposed much closer together than in the fresh ore as first reduced, so close in fact that during passage of the pellets through the kiln, the iron particles thereof will in general agglomerate and bond together into particles much greater in size with can easily be separated from the gangue on subsequent grinding and thereby be concentrated into a high purity product.

In accordance with certain refinements of our invention, the ore is crushed and screened into coarse and fine fractions as discussed below. The fine fraction is fed to the pelletizer along with the middlings fraction of the iron concentrate. The moist pellets from the pelletizer are dried and hardened and preheated on a traveling grate heated by the kiln flue gas before recycling through the kiln, onto which grate also the coarse ore fraction is concurrently fed as an underlay for the pellets, whereby this ore fraction is also dried and preheated. In addition, the kiln flue dust and that from the grate are fed to the pelletizer for further increasing the recovery of metallic iron from the ore.

Having thus basically described the essential features of the invention, reference will now be had for a detailed description of these and other features, to the accompanying drawing comprising a schematic layout and flow sheet of a preferred method and apparatus for practicing the invention.

Referring to the drawing, the fresh ore to be processed, and which has previously been crushed and screened into coarse and fine ore fractions of $-\frac{1}{2}$ x $+\frac{1}{8}''$ and $-\frac{1}{8}$ x $0''$, is delivered into coarse ore and fine ore bins 10 and 11, respectively. From the base of bin 11, the fine ore fraction is discharged to a pelletizer 12. To the fine ore in the pelletizer is added a continuous stream of dust collected from an ore-pellet grate 13, heated by flue gas, as indicated at 14, from the rotary kiln 15, this dust being conveyed to the pelletizer as indicated at 16. The portion of the flue gas not required for heating the grate 13, is diverted as at 17, and fed through a dust collector 18, the dust from which is also fed to the pelletizer, as at 19. Also added to the pelletizer and conveyed thereto as at 20–21, as discussed below, is the middlings fraction of the iron concentrate, derived as above generally set forth.

In the pelletizer 12, sufficient water is added to form green pellets, which are immediately transferred, as at 22, onto a traveling grate element 23 of the grate unit 13. From the base of the corase ore bin 10, the coarse ore is also fed as indicated at 24, onto the traveling grate 23. The aforesaid materials are fed onto the traveling grate in such manner that the green pellets from the pelletizer 12 are spread over the top of the coarse ore fraction delivered from the coarse ore bin. During passage through the grate 13, the green pellets are dried and hardened by the kiln flue gases conveyed thereto, as above explained. The hot flue gases enter the grate 13 at the left at a temperature of about 1850° F., and exit therefrom at the right, as at 25, at a temperature of about 400° F., so that the hot flue gases thus travel in the grate in countercurrent to the direction of feed of the pellets and ore on the traveling grate 23. The exit temperature of about 400° F. of the flue gases prevents the gases at excessively high temperature from contacting the wet pellets, which tend to spall if heated too rapidly. The hot flue gas stream thus flowing through the grate 13 not only serves to dry and harden the pellets but also dries the ore and preheats both the ore and the pellets to the temperature of about 1850° F. as discharged from the grate 13. Oxidation of the metallic iron in the pellets, as derived from the middling fraction, does not produce re-oxidation thereof due to the carbon present in the pellets.

The rotary kiln 15 is constructed and operated as described in said Moklebust Patent 2,829,042, and consists of a feed end housing 26 and a discharge or delivery end housing 27, between which extends the rotary kiln unit 28. As described in said patent, the rotary kiln 28 is penetrated at points spaced therealong and thereabout with air inlet tubes, as indicated at 29, which extend to the kiln axis, and open thereat in the axial direction, for regulating the combustion and temperature conditions throughout the length of the kiln as described in said patent.

The coarse ore and hardened pellets discharged from the traveling grate 13, are conveyed thence as at 30, into the rotary kiln 15 through its feed end housing 26, along with —⅛″ char, stored in bins 30, 31, from which the char is fed into the rotary kiln, as indicated at 32. Bin 31 contains new char, while bin 30 contains recycle char derived as discussed below.

As the charge of ore, pellets and char are thus fed together into and through the rotary kiln 15, the charge is maintained at reduction temperature by burning natural gas or the like in the kiln by means of the burner indicated at 33 in the delivery end housing 27, which is supplied with a mixture of natural gas and a limited amount of air, which as supplemented by the air introduced through the tubes 29, controls the combustion and temperature conditions in such manner throughout the kiln and, as described in said Moklebust patent, as to reduce approximately 90% of the iron in the ore and pellets to the metallic state. Carbon in the pellets and some of the char is consumed in the reduction to form carbon monoxide which rises from the bed to be partially burned with air entering from the air tubes 29. The flue gas flows from the kiln countercurrent to the solid feed.

The portion of the flue gas diverted to the insulated dust collector 18, is available for heat recovery in recycle char dryers and other plant uses, as indicated generally at 34, 35.

The kiln 15 is rotated by a motor 36, to provide adequate movement, heat transfer, retention time and preferably 35% volumetric depth of the kiln bed of the ore, char and pellet mixture. The metallized ore and pellets along with excess char and ash are discharged from the kiln at 37, at a temperature of about 1900° F., and delivered thence into a rotary cooler 38, wherein the solids are cooled to a maximum of about 700° F. The heat is removed by water on the outside shell of the cooler. From the cooler the solids discharge into a quench tank 39, from which rakes dewater and transfer the material, to conveying means indicated at 40 and thence to an elevator 41, from whence the material is discharged into a storage bin 42.

From the base of bin 42 the metallized ore and pellets, excess char and ash are delivered onto a vibrating screen 43, the coarse reject from which, comprising —¼″ material, discharges as at 44, into a ball mill 45. The fines through the screen comprising —¼″ material, is washed with water into the dual magnetic separators 46, the non-magnetic char from which is discharged onto a coke table 47. The char is washed from this table into a continuous centrifuge 48, which dewaters the char to about 16–20% moisture, and discharges it onto a recycle conveying system indicated at 49, which returns the char to a bin 50, from the base of which it is fed progressively through a dryer 51, and conveyed thence as at 52 into the recycle char bin 30. The effluent from the centrifuge 48 flows, as at 53, into a thickening tank 54, where it joins tailings from the concentrating circuit as described hereinafter. The underflow from the thickening tank flows into pumps for discharge to waste as indicated at 55. The overflow water from the thickener tank goes to a storage tank, as indicated at 56, and is reused in the plant. The gangue from the coke table 47, and the magnetic discharge from the dual separators 46, is fed into the ball mill 45, along with the coarse reject from screen 43, the latter as above described.

A total of three ball mills 45, 60 and 61, each followed by a magnetic separator 62, 63 and 64, is employed to grind and concentrate the metallized ore and pellets. The first grinding stage 45 is an open circuit, its output being fed to separator 62. Each of the second and third grinding stages 60 and 61, is in closed circuit with the preceding separator and a hydro-cyclone, as at 65 and 66, the coarse fraction from which is recycled, reseparated and reground, and the effluent from which is fed to the separator of the next succeeding stage. The tailings from the separators 62–64, inc., are fed to a magnetic separator 67, the concentrate from which is recycled to the discharge from the first stage mill 45 and fed therewith into the first stage separator 62.

The concentrate from the separator 64 following the final or third stage mill 61, is fed to a hydraulic, gravity classifier 68, the overflow material from which is fed to a magnetic separator 69, a middling fraction from which is recirculated to the pelletizer 12, over the feed line 20 which discharges into a thickening tank 70, the underflow from which is filtered on a horizontal vacuum filter 71, the filter cake from which is fed as at 21, to the pelletizer 12.

The underflow material from the hydraulic classifier 68, is fed to the dual magnetic separators 72, from which the final concentrate discharges onto a horizontal vacuum filter 73. The filtered concentrate containing about 8% moisture, is conveyed thence, as at 74, into a surge bin 75, and fed therefrom through a rotary dryer 76, heated by flue gases from the rotary kiln 15. In the dryer the moisture content of the concentrate is reduced to about 1%. The dried concentrate is conveyed thence via conveyors and an elevator, as at 77, into a surge bin 78, from the base of which it is fed to a ring roller press 79, which presses the concentrate into briquettes containing about 90% total iron. The briquettes are useful as feed stock in open hearth and electric furnaces.

In order to compare the metallic iron recoveries obtained with the flow sheet processing of the drawing wherein the effluent from the hydraulic separator 68 is fed, on the one hand, directly to the tailings tank 54, as compared to that wherein a middling fraction of the effluent is separated, as at 69, and further processed to the pellet stage and recycled through the reduction kiln as above described, the following tests were run:

A pilot line rotary kiln and concentrating system in accordance with the flow sheet and located at Birmingham, Alabama, was employed for these tests. The rotary kiln unit had a length of 150' and an inside diameter of 7.5'. The iron ore used for the tests was obtained from Peace River, Canada, and was of the following analysis:

| Constituent: | Percent by wt. |
|---|---|
| Total iron | 37.0 |
| Silica | 20.0 |
| Alumina | 8.0 |
| Lime | 4.0 |
| Phosphorus | 0.7 |
| Sulphur | 0.02 |

The "as received" ore was crushed and screened as aforesaid before processing in the kiln. During the tests the ore was fed into the kiln at the rate of about 4.5 tons per hour, this rate being maintained throughout the tests. Coke in excess of the stoichiometric amount required to reduce the ore was fed into the kiln along with the ore, the ore/coke ratio being maintained at about 1.5:1 by weight.

During a first reduction run, the concentration system was arranged, referring to the flow sheet, with the effluent from the classifier 68, directed to the tailings tank 54. After steady state conditions of operation had been obtained, the metallic iron recoveries were determined for each 24-hour day of operation, for a period of three days. A second run was then made with the concentration system arranged in accordance with the flow sheet processing of the present invention, in which the effluent from separator 68, was fed to the separator 69, and a middlings fraction therefrom was dewatered, pelletized and recycled through the kiln in the manner above described. After steady state condition of operation obtained, the iron recoveries were again determined for each 24-hour day of operation for a period of five days. The comparative results averaged over each period of operation are given in the following table:

*Percent Metallization, Percent Iron in Final Concentrate and Percent Iron Recovery*

| First Run, Separator Effluent to Tailings Cone | | | Second Run, Separator Effluent Pelletized and Recycled | | |
|---|---|---|---|---|---|
| Percent Met. | Percent Fe | Percent Fe Recovery | Percent Met. | Percent Fe | Percent Fe Recovery |
| 92.59 | 86.97 | 62.63 | 90.86 | 90.00 | 83.17 |

It will be seen from the above that although a high purity concentrate of better than 90% metallization was obtained in each instance, a much higher percent of metallic iron as such was recovered from the ore by means of the pelletized recycling of the middlings fraction in accordance with the present invention as compared to the prior practice of diverting this fraction to tailings in order to obtain a high purity final concentrate, the increase in iron recovery being on the order of 20%.

What is claimed is:

1. A process for low temperature reduction and recovery of iron in high yield from iron oxide bearing materials, and as a metallic iron concentrate of high purity, which comprises: reducing a charge of said ore without fusion, comminuting the reduced product and magnetically concentrating the iron values, separating the concentrate into fractions of higher and lower purity, pelletizing the latter and admixing with a charge of fresh ore, subjecting the mixture to reduction without fusion, comminuting the reduced product and magnetically concentrating the iron values.

2. A continuous process for low temperature reduction and recovery of iron in high yield from iron oxide bearing materials, and as a metallic iron concentrate or high purity, which comprises: as a first step, reducing a charge of said ore without fusion, comminuting the reduced product and magnetically concentrating the iron values, separating the concentrate into fractions of higher and lower purity and pelletizing the latter, and as a second step, admixing the pellets with a charge of fresh ore, subjecting the mixture to reduction without fusion, comminuting the reduced product, magnetically concentrating the iron values, separating into fractions of higher and lower purity and pelletizing, and thereafter continuing to repeat the procedure of the second step.

3. A continuous, rotary kiln process for low temperature reduction and recovery of iron in high yield from iron oxide bearing materials, and as a metallic iron concentrate of high purity, which comprises: progressively feeding said ore and a solid reductant into and through said kiln and subjecting to reducing conditions therein without fusion, progressively grinding and magnetically concentrating the kiln discharge, progressively separating the resulting concentrate into fractions of higher and lower purity, progressively pelletizing the latter and recycling through the kiln with progressive additions of fresh ore and said solid reductant.

4. In a rotary kiln process for low temperature reduction and recovery of metallic iron in high yield from iron oxide bearing materials, and as a metallic iron concentrate of high purity, and wherein a concentrate fraction of relatively low purity is pelletized and recycled through the kiln, the steps which comprise: progressively feeding fresh ore together with said pellets and a solid reductant into and through the kiln while subjecting the same to reduction conditions therein without fusion, progressively screening, tabling, grinding and magnetically concentrating the kiln discharge, separating the concentrate into fractions of higher and lower purity, pelletizing the latter and recycling through the kiln with fresh ore and said solid reductant.

5. In a rotary kiln process for low temperature reduction and recovery of metallic iron in high yield from iron oxide bearing materials, and as a metallic iron concentrate of high purity, and wherein a concentrate fraction of relatively low purity is pelletized and recycled through the kiln, the steps which comprise: progressively feeding fresh ore together with said pellets and a solid reductant into and through the kiln while subjecting the same to reduction conditions therein, screening, tabling, grinding and magnetically concentrating the kiln discharge, separating the concentrate into fractions of higher and lower purity, magnetically concentrating the former to provide a high purity concentrate containing at least 90% of metallization and total iron, magnetically separating a middlings fraction from said fraction of lower purity, pelletizing the same and recycling through the kiln with fresh ore and said solid reductant.

6. In a rotary kiln process for low temperature reduction and recovery of metallic iron in high yield from iron oxide bearing materials, and as a metallic iron concentrate of high purity, and wherein a concentrate fraction of relatively low purity is pelletized and recycled through the kiln, the steps which comprise: progressively feeding fresh ore together with said pellets and a solid reductant into and through the kiln while subjecting the same to reduction conditions therein, subjecting the reduced ore product to successive stages of grinding, magnetic and gravity separations to provide a metallic iron concentrate, gravity separating said concentrate into a relatively large fraction of higher purity and a relatively small fraction of lower purity, magnetically concentrating the higher purity fraction to provide a final concentrate of at least 90% metallization and total iron content, magnetically separating from the fraction of lower purity, a middlings fraction, pelletizing the latter and recycling through the kiln together with fresh ore and said solid reductant.

7. In a rotary kiln process for low temperature reduction and recovery of metallic iron in high yield from iron oxide bearing materials, and as a metallic iron concentrate of high purity, and wherein a concentrate fraction of relatively low purity is pelletized and recycled through the kiln, the steps which comprise: progressively feeding fresh ore together with said pellets and a solid reductant into and through the kiln while subjecting to reduction conditions without fusion therein, quenching and magnetically concentrating the magnetic fraction of the kiln discharge, and subjecting the same to successive stages of grinding, magnetic and gravity separation to provide an iron concentrate, gravity separating said concentrate into a major fraction of relatively high purity and a minor fraction of lower purity, magnetically concentrating the high purity fraction to provide a final concentrate of at least 90% metallization and total iron content, magnetically separating from the fraction of lower purity, a middlings fraction, pelletizing the same and recycling through the kiln together with fresh ore and said solid reductant.

8. In a rotary kiln process for low temperature reduction and recovery of metallic iron in high yield from iron oxide bearing materials, and as a metallic iron concentrate of high purity, and wherein a concentrate fraction of relatively low purity is pelletized and recycled through the kiln, the steps which comprise: progressively feeding fresh ore together with said pellets and a solid reductant into and through the kiln while subjecting the same to reduction conditions without fusion therein, quenching the kiln discharge and subjecting to successive stages of wet grinding, magnetic and gravity separation to provide a metallic iron concentrate, separating said concentrate into a major fraction of higher purity and a minor fraction of lower purity, magnetically concentrating the fraction of higher purity to give a final concentrate of at least 90% metallization and total iron content, filtering and briquetting the latter, magnetically separating from the fraction of lower purity, a middlings fraction, filtering and pelletizing the latter, and recycling through the kiln together with fresh ore and said solid reductant.

9. In a rotary kiln process for low temperature reduction and recovery of metallic iron in high yield from iron oxide bearing materials, and as a metallic iron concentrate of high purity, and wherein a concentrate fraction of relatively low purity is pelletized and recycled through the kiln, the steps which comprise: progressively feeding fresh ore together with said pellets and a solid reductant into and through the kiln while subjecting the same to reduction conditions without fusion therein, cooling and water quenching the kiln discharge, and subjecting to successive stages of wet grinding, magnetic and gravity separation to provide an iron concentrate, gravity separating said concentrate into a major fraction of higher purity and a minor fraction of lesser purity, magnetically concentrating said fraction of higher purity to give a final concentrate of at least 90% metallization and total iron content, magnetically separating from the fraction of lesser purity a middlings fraction, pelletizing the latter along with the flue dust from the kiln, and recycling through the kiln with fresh ore and said solid reductant.

10. In a rotary kiln process for low temperature reduction and recovery of metallic iron in high yield from iron oxide bearing materials, and as a metallic iron concentrate of high purity, and wherein a middlings concentrate fraction is pelletized and recycled through the kiln, the steps which comprise: screening said ore into coarse and fine fractions, pelletizing said fine ore fraction together with dust from the kiln flue gas and said middlings concentrate fraction, feeding said pellets together with said coarse ore fraction through a dryer heated by flue gas from the kiln for drying and preheating the same, and thence into and through the kiln while subjecting the same to reducing conditions therein without fusion, water quenching the kiln discharge and subjecting to successive stages of wet grinding, magnetic and gravity separation to provide an iron concentrate, gravity separating said concentrate into a major fraction of higher purity and a minor fraction of lower purity, magnetically concentrating the fraction of higher purity to provide a final iron concentrate of at least 90% metallization and total iron content, magnetically separating from the fraction of lower purity, a middlings fraction, and pelletizing the latter along with said flue dust and fine ore fraction.

References Cited in the file of this patent
UNITED STATES PATENTS
1,800,856    Bradley _____ Apr. 14, 1931